Patented Feb. 13, 1951

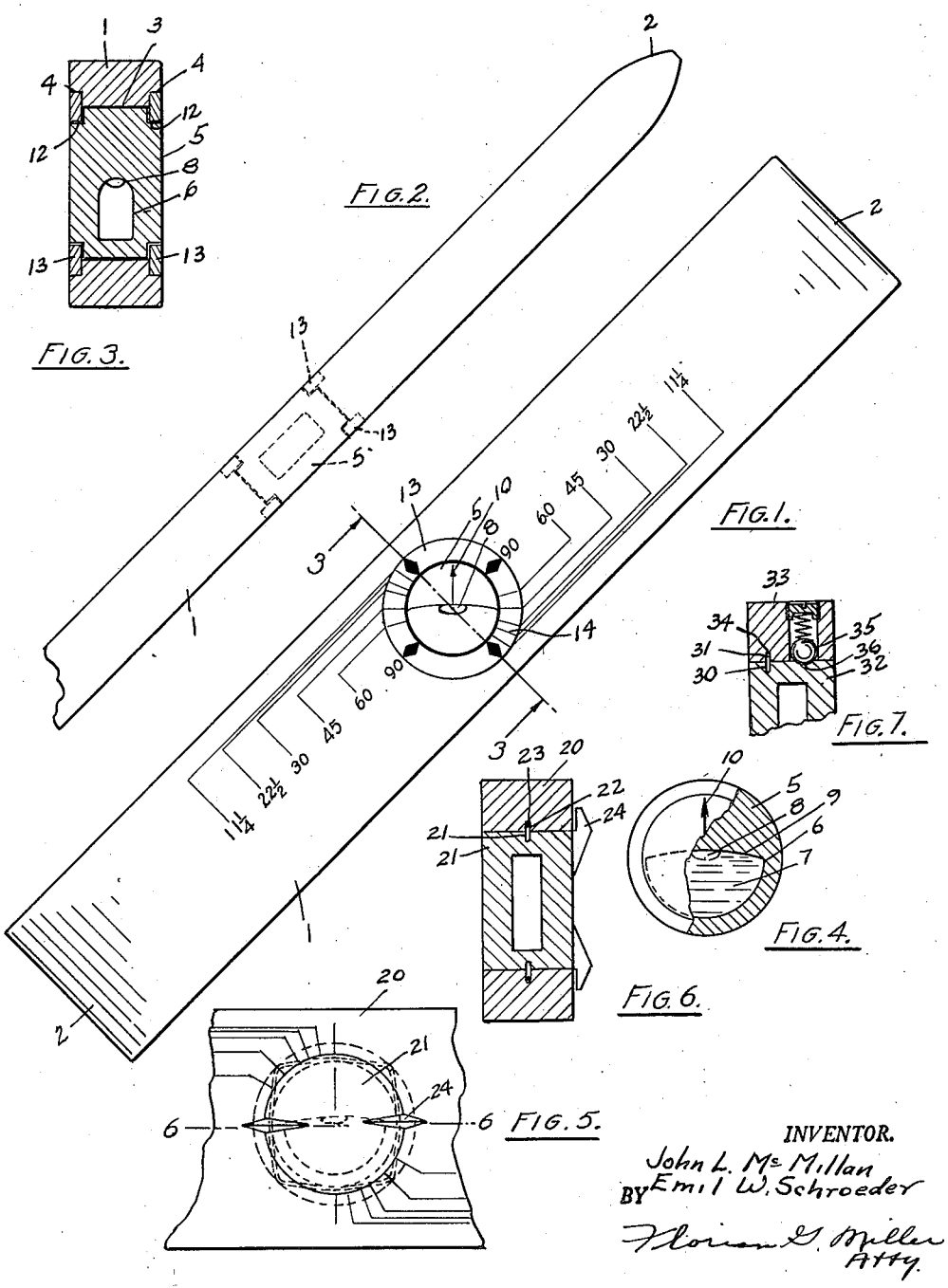

2,541,880

UNITED STATES PATENT OFFICE 2,541,880

ROTATABLE LEVEL

John L. McMillan, Oaklawn, Ill., and Emil W. Schroeder, Erie, Pa.

Application February 4, 1947, Serial No. 726,276

2 Claims. (Cl. 33—213)

This invention relates generally to levels and more particularly to a universally adaptable level.

Levels heretofore provided for levelling angularly disposed members have cylindrical glass liquid containers disposed in a horizontal plane parallel with the straight edge of the level, in a plane 90 degrees normal to the straight edge of the level, or in a plane 45 degrees from the straight edge of the level. These glass containers break quickly and the life of the level is very short. Furthermore, only a horizontal, 45 degree or 90 degree surface can be measured with the present levels when a sufficient number of cylindrical glass liquid containers are disposed in a level which makes the level very costly. When a pipefitter, iron worker or the like is fitting a pipe, or a steel beam, no means has heretofore been provided to move a bubble glass to any desired angle through 360 degrees to measure various angles.

It is, accordingly, an object of my invention to provide a level which is universally adaptable, economical in cost, economical in manufacture, simple in construction, easy to read and operate, and rugged in construction.

Another object of my invention is to provide a level wherein indications are provided to determine any angle at which the straight edges of the level are disposed.

Another object of my invention is to provide a level having a rotatable bubble container therein movable diametrically in a cylindrical member.

Another object of my invention is to provide a novel centrally disposed vial having a bubble movable diametrically thereacross which may be rotated through 360 degrees rotation.

Another object of my invention is to provide a single bubble in a level to measure a plurality of angles.

Another object of my invention is to provide a level which may be made from plastic material.

Other objects of my invention will become evident from the following detailed description, taken in conjunction with the accompanying drawings, in which Fig. 1 is a side elevational view of my novel level in an angular position;

Fig. 2 is a top plan view of the level shown in Fig. 1;

Fig. 3 is a view taken on the line 3—3 of Fig. 1; and

Fig. 4 is a side elevational view with parts broken away of the rotatable centrally disposed member in my novel level.

Figs. 5 and 6 are respectively a side elevational and a cross-sectional view of a modified form of level; and Fig. 7 is a cross-sectional detail of another modified form.

Referring now to the drawings, Figs. 1 to 4, inclusive, show a straight-edged rectangular shaped member 1 having rounded ends 2 and a centrally disposed well 3 with cut-away annular recesses 4 on each side thereof. For purposes of illustration, I have shown disposed in the well 3 of the level 1 a cylindrical shaped member 5 having a semi-cylindrical shaped chamber 6 formed therein and filled with a liquid 7 forming a bubble 8 movable around the periphery thereof. Although I have shown the upper side 9 of the chamber 6 in arcuate shape, it will be evident that the upper surface 9 may take other shapes without departing from the spirit of my invention. An indicating member 10 is extended radially outwardly to the periphery of the member 5 from the center thereof and centrally of the arcuate shaped upper surface 9 of the chamber 6. The cylindrical member 5 has cut-away annular recesses 12 which merge with the annular recesses 4 of the member 3 to form an annular shaped recess of rectangular form on each side of the member 5. A ring member 13 is disposed in each of the rectangular shaped annular recesses formed by the recessed portions 4 and 12 of the members 3 and 5, respectively, and have graduations 14 extending radially outwardly thereon to indicate any desired divisions of a 360 degree circle. I have shown the divisions as small as 11¼ degrees although it will be evident that any number of divisions of the 360 degree circle may be provided.

Although I have shown the cylindrical shaped member 5 as a solid member, it will be evident that this may be merely an annular ring member with an arcuate shaped vial in one side thereof so that a bubble would move diametrically across the cylindrically shaped member.

In operation, the level as shown in Fig. 1 is set for whatever angle is desired by moving the rotatable member 5 so that the indicating pointer 10 is aligned with the desired angular graduation 14 on the ring member 13. The level 1 is then placed against a pipe or beam or any other member to be fitted and the bubble 8 is disposed centrally of the arcuate shaped upper portion 9 as shown in Fig. 1 wherein the desired angle of the member to be fitted is obtained. Magnetic members may be disposed along the straight edge or on any portion of the level 1 so that the level may be held against an iron or steel pipe by magnetic attraction.

A modified form of level 20 shown in Figs. 5 and 6 comprises a cylindrical vial 26 having a peripheral groove 21 complementary to a peripheral groove 22 in the well of level 20 wherein a single spring member 23 may be used for holding the vial 21 in place. The spring member 23 is polygonal or oval shaped so that it engages both of said peripheral grooves 21 and 22. It may be any other suitable shape as long as it engages both of the peripheral grooves 21 and 22 at the same time. The cylindrical vial 26 is disposed in the well of a level and the spring member 23 snaps in the grooves 21 and 22 to hold the vial in place. A handle 24 is provided for rotating the vial 21.

Fig. 7 also shows complementary grooves 30 and 31 in a vial 32 and level 33 to receive a spring member 34 and also shows a spring-urged ball 35 to engage spaced recesses 36 around the periphery of the vial 32.

It will be evident from the foregoing description that I have provided a novel level which is adaptable for leveling a member at any desired angle in a 360 degree circle by the use of one level.

Various changes may be made in the specific embodiment of my invention without departing from the spirit thereof or from the scope of the appended claims.

What we claim is:

1. A level comprising a straight-edged member having a centrally disposed circular well with indicating lines adjacent the periphery thereof, a cylindrical, transparent member in said well having a semi-circular shaped chamber therein with the central portion thereof in arcuate shape, liquid in said chamber forming a bubble movable about the periphery thereof, said bubble being substantially in the center of said cylindrical member when it is midway between the ends of said arcuate side of said arcuate shaped chamber extending transversely of said cylindrical member, and a pointer line on said cylindrical member extending radially outwardly from the center thereof and from the center of the arcuate shaped portion of said semi-circular shaped chamber, adapted to be aligned with said indicating means on said cylindrical member.

2. A level comprising a straight-edged member having a well with a peripheral groove and indicating lines around the periphery thereof, a cylindrical, rotating indicating vial disposed in said well having a peripheral groove complementary to the peripheral groove in said well, graduations formed adjacent the periphery of said vial adapted to be aligned with said indicating lines adjacent said well, and a spring member disposed in said complementary grooves for rotatably securing said vial in said well, said spring member being shaped so that it engages both of said complementary grooves.

JOHN L. McMILLAN.
EMIL W. SCHROEDER.

REFERENCES CITED

The following references are of record in the file of this patent:

UNITED STATES PATENTS

| Number | Name | Date |
| --- | --- | --- |
| 281,086 | Lemon | July 10, 1883 |
| 832,326 | Kleinbauer | Oct. 2, 1906 |
| 893,992 | Fuessel | July 21, 1908 |
| 1,592,734 | Hagstrom | July 13, 1926 |
| 1,830,009 | Walters | Nov. 3, 1931 |
| 2,129,695 | Karnes | Sept. 13, 1938 |
| 2,305,678 | Cravaritis et al. | Dec. 22, 1942 |

FOREIGN PATENTS

| Number | Country | Date |
| --- | --- | --- |
| 87,770 | Germany | 1896 |